US006971324B1

(12) United States Patent
Beck

(10) Patent No.: US 6,971,324 B1
(45) Date of Patent: Dec. 6, 2005

(54) BULK SEED HANDLING AND DISPENSING SYSTEM

(76) Inventor: Tom J. Beck, 2433 "Y" Rd., Clarks, NE (US) 68628

( * ) Notice: Subject to any disclaimer, the term of this patent is extended or adjusted under 35 U.S.C. 154(b) by 144 days.

(21) Appl. No.: 10/926,179

(22) Filed: Aug. 25, 2004

(51) Int. Cl.$^7$ .................. B65G 67/02; A01C 23/00
(52) U.S. Cl. ................ 111/200; 111/9; 111/925; 414/523
(58) Field of Search ............ 111/8, 9, 118–120, 111/56–63, 174, 925, 200; 414/503–526; 222/105, 185, 529; 198/311, 312, 317

(56) References Cited

U.S. PATENT DOCUMENTS

| 4,669,945 | A | * | 6/1987 | Pollard et al. | ............... | 414/505 |
| 4,742,938 | A | * | 5/1988 | Niewold | ............... | 222/381 |
| 5,108,249 | A | * | 4/1992 | Kinzenbaw et al. | ........ | 414/523 |
| 5,257,893 | A | * | 11/1993 | Sevits | ............... | 414/523 |
| 5,718,556 | A | * | 2/1998 | Forsyth | ............... | 414/503 |
| 5,785,481 | A | * | 7/1998 | Ockels | ............... | 414/523 |
| 5,888,044 | A | * | 3/1999 | Baskerville | ............... | 414/523 |
| 6,092,974 | A | | 7/2000 | Roth | ............... | 414/526 |
| 6,120,233 | A | | 9/2000 | Adam | ............... | 414/502 |
| 6,396,003 | B1 | * | 5/2002 | Friesen | ............... | 177/136 |
| 6,772,702 | B2 | * | 8/2004 | Lee et al. | ............... | 111/174 |

* cited by examiner

*Primary Examiner*—Robert E. Pezzuto
(74) *Attorney, Agent, or Firm*—Thomte, Mazour & Niebergall; Dennis L. Thomte

(57) ABSTRACT

A bulk seed handler and dispenser is provided for transporting bulk seed containers and for dispensing the seed within the containers into planting equipment. The bulk seed handler and dispenser is comprised of a trailer having a plurality of bulk seed containers mounted thereon, each of which is in communication with individual hoppers located therebelow. A discharge auger conveyor is in selective communication with each of the hoppers and is adapted to convey the seed from the hoppers through a discharge tube which is maneuvered for placement adjacent planter unit hoppers.

8 Claims, 7 Drawing Sheets

BULK SEED HANDLING AND DISPENSING SYSTEM

Your Petitioner, TOM J. BECK, a citizen of the United States and a resident of the State of Nebraska, whose post office address is 2433 "Y" Road, Clarks, Nebr. 68628, prays that Letters Patent may be granted to him for the invention set forth in the following specification:

BACKGROUND OF THE INVENTION

1. Field of the Invention

This invention relates to a bulk seed handling and dispensing system and more particularly to a system wherein a plurality of bulk seed containers are selectively removably positioned on a trailer and means for dispensing the seed therefrom into planting units is provided thereon.

2. Description of the Related Art

Agricultural seeding machines such as a row crop planter or grain drill are used to place seeds at a desired depth within a plurality of parallel seed trenches. Historically, row crops such as corn are planted with row planters which normally consist of a plurality of spaced-apart planter units mounted on a supporting frame such as a tool bar or the like. Usually, each of the planter units includes a seed box or hopper thereon which must be filled with seed. Non-row crops such as wheat, soybeans, oats, barley, etc., are planted by means of grain drills. The grain drills include a seed hopper positioned thereon. In both types of planting, the seed boxes or hoppers thereof must be filled with seed. In many cases, individual bags of seed are hand-carried to the planters with the seed being poured therefrom into the planter boxes or hoppers. In recent years, seed has been supplied to the farmers in bulk form, that is, the seed is contained in large seed containers, sometimes called "totes," carried on a trailer or the like and is dispensed therefrom to the planter boxes or hoppers by an auger conveyor.

It is believed that the prior art bulk seed handling or dispensing systems suffer from one or more drawbacks or disadvantages. First, in certain systems where two or more seed containers or totes are positioned on a trailer, the seed from the two or more seed containers flow into a common hopper from which the seed is dispensed which makes it impossible to have different seed hybrids or varieties in different containers on the trailer. Second, the prior art bulk seed handling systems are not believed to have a convenient means for cleaning out the seed hopper beneath the seed container thereby possibly resulting in contamination of one seed hybrid or variety with another seed hybrid or variety if the system first dispenses one seed hybrid or variety and is then used to dispense another seed hybrid or variety. Third, the prior art bulk seed handling systems are believed to have a high center of gravity due to the fact that the seed containers are positioned substantially above the ground or road surface. Such a high center of gravity may result in the system overturning when traveling around a curve or corner or over rough terrain. Fourth, the prior art bulk seed handling systems are not believed to be convenient to use.

SUMMARY OF THE INVENTION

A bulk seed handling and dispensing cart, caddy, trailer, apparatus, etc., is described for transporting bulk seed containers and for dispensing the seed from the containers into the seed hoppers or boxes on planting equipment. The apparatus includes a wheeled frame such as a trailer having a forward end, a rearward end, and first and second sides. The wheeled frame has a forwardly extending hitch tongue for connection to a prime mover such as a truck or tractor. A generally horizontally disposed deck is positioned on the wheeled frame which defines a front deck portion and a rear deck portion. The front and rear deck portions are adapted to have front and back bulk seed containers positioned thereon, respectively. The front deck portion has a front seed inlet opening formed therein and the rear deck portion has a rear seed inlet opening formed therein. A front seed hopper is positioned beneath the front seed inlet opening and has an open upper end in communication therewith. The front seed hopper has a selectively closeable seed discharge opening at its lower end. A rear seed hopper is positioned beneath the rear seed inlet opening and has an open upper end in communication therewith. The rear seed hopper has a selectively closeable seed discharge opening at its lower end. A housing is positioned at the lower ends of the front and rear seed hoppers and which is in communication with the discharge openings thereof. A seed discharge auger conveyor is provided on the wheeled frame and has upper and lower ends. An internal combustion engine is provided on the wheeled frame and is adapted to operate the discharge auger conveyor. The lower end of the discharge auger conveyor is in communication with the housing with the discharge auger conveyor extending upwardly and generally laterally from the wheeled frame. A telescopic seed discharge tube has its upper end connected to the upper end of the discharge auger conveyor. The lower end of the seed discharge tube may be maneuvered to each of the seed boxes or hoppers on the planters to fill the same. A remote control is provided at the lower end of the discharge tube to control the operation of the seed discharge auger conveyor by varying the speed of the engine.

It is therefore a principal object of the invention to provide an improved bulk seed handling and dispensing system.

A further object of the invention is to provide a bulk seed handling and dispensing system wherein at least two bulk seed containers are positioned on a wheeled frame such as a trailer.

Yet another object of the invention is to provide a system of the type described wherein seed in each of the seed containers is fed into an individual hopper which is in selective communication with a discharge auger conveyor.

Still another object of the invention is to provide a system of the type described which has a low center of gravity.

Still another object of the invention is to provide a system of the type described which has an improved clean out mechanism associated therewith.

Yet another object of the invention is to provide a system of the type described which is convenient to use.

These and other objects will be apparent to those skilled in the art.

DETAILED DESCRIPTION OF THE INVENTION

Figure 1:
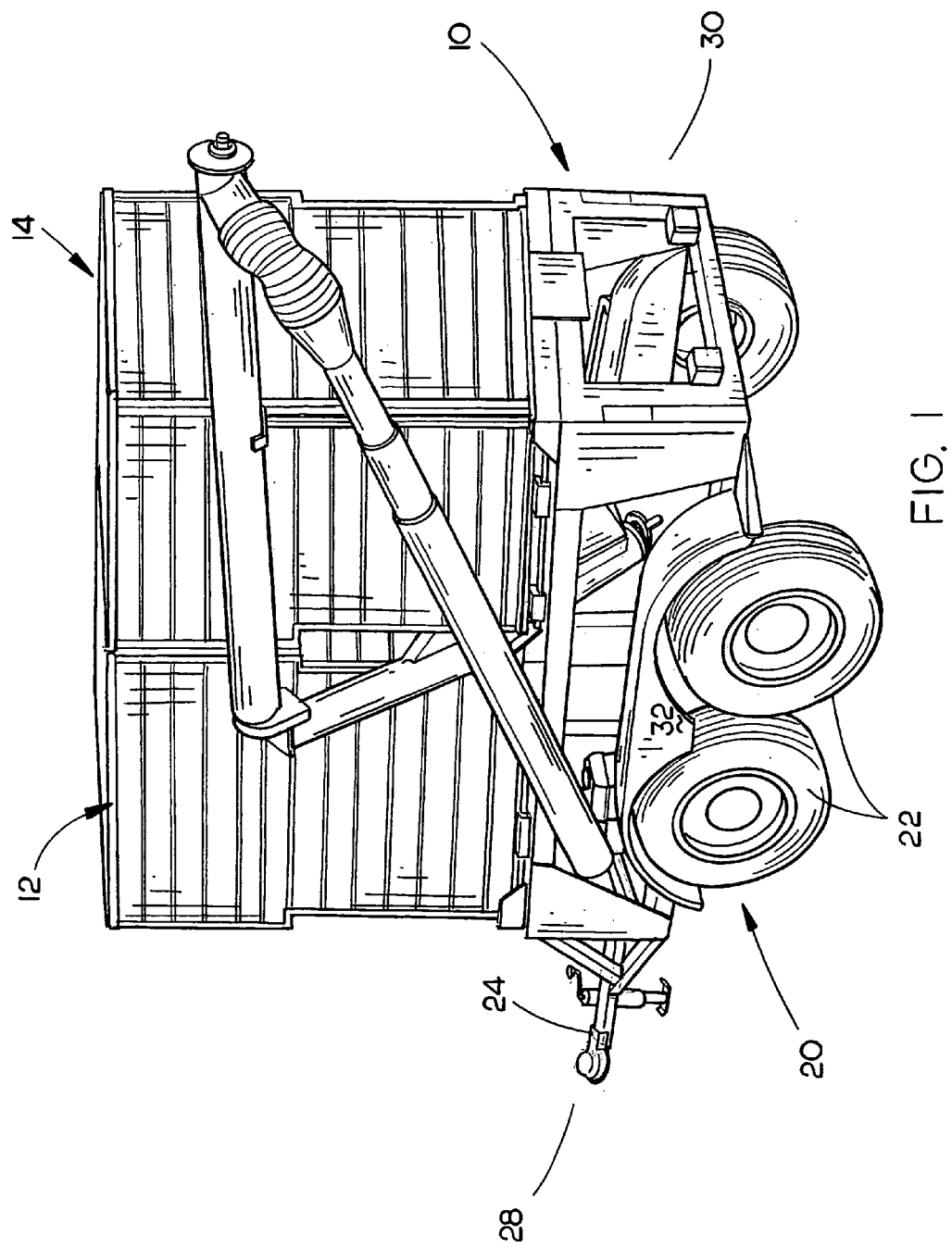
FIG. 1 is a rear perspective view of the seed handling and dispensing system of this invention.
Figure 2:
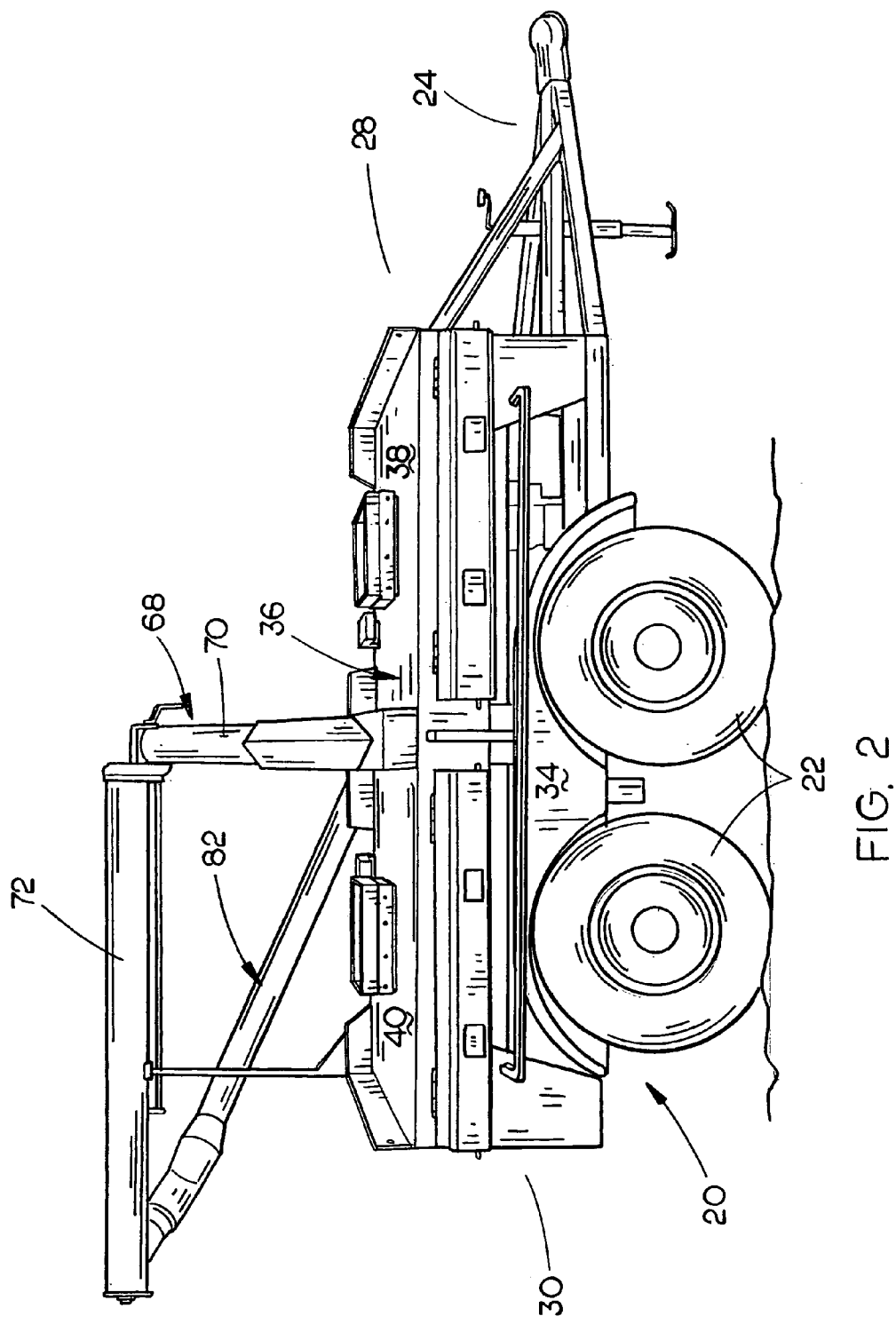
FIG. 2 is a side view of the seed handling and dispensing system of this invention which illustrates the bulk seed containers removed therefrom.
Figure 3:
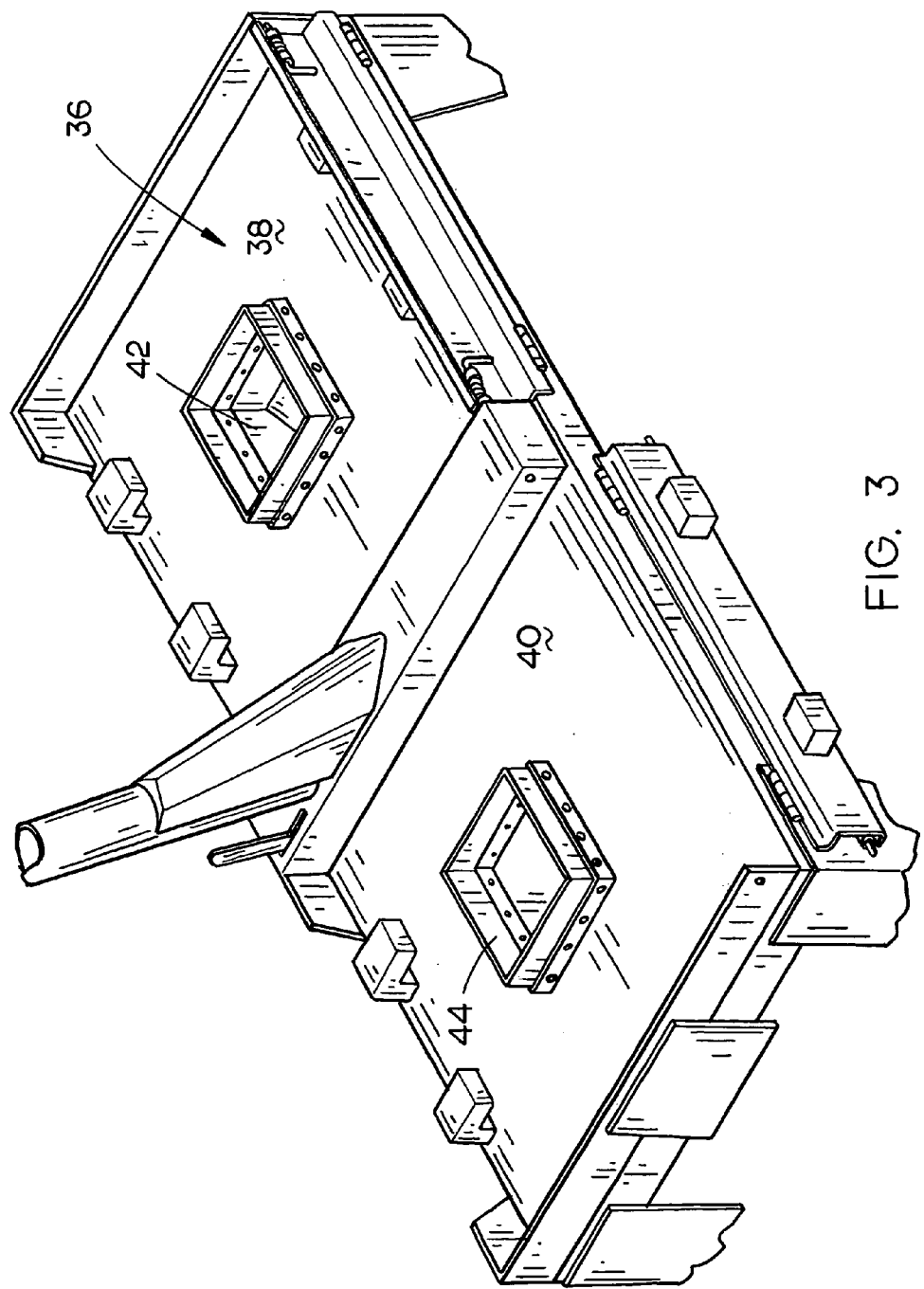
FIG. 3 is a perspective view of the deck portion of the apparatus which supports the bulk seed containers thereon.
Figure 4:
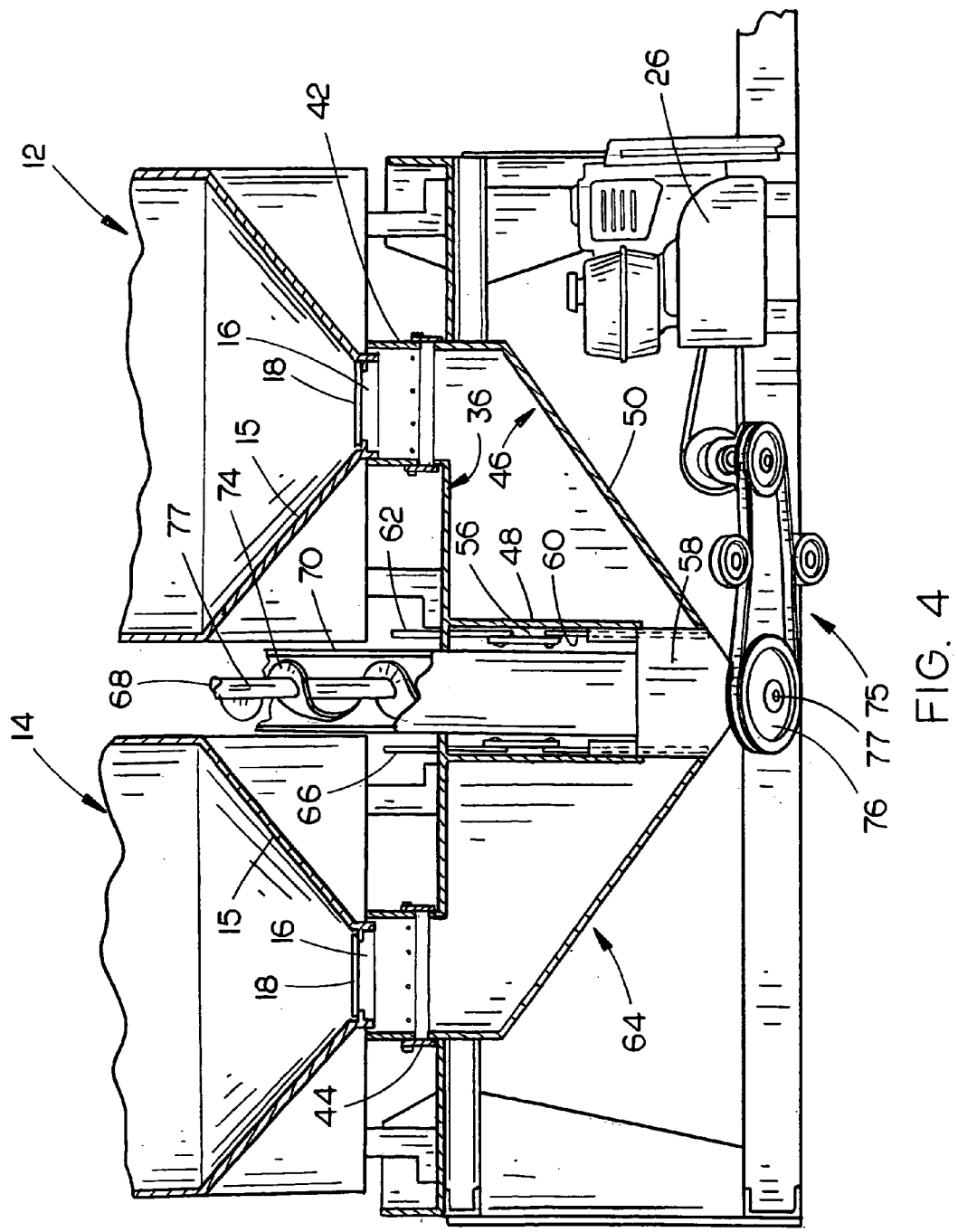
FIG. 4 is a partial sectional view illustrating the bulk seed containers and the relationship thereof with respect to the apparatus of this invention.
Figure 5:
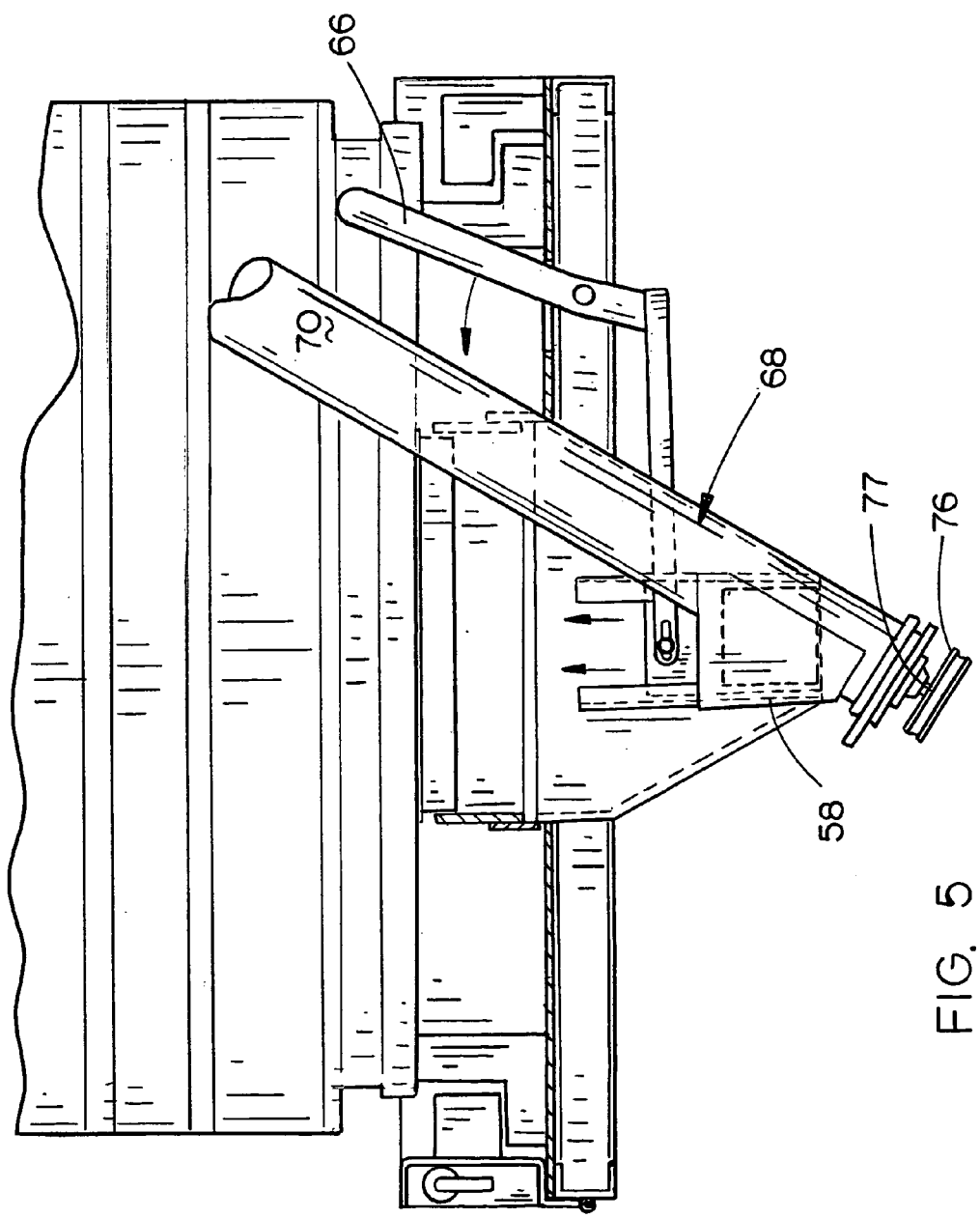
FIG. 5 is a partial sectional view illustrating the manner in which the slide gates of the hoppers of the apparatus are controlled.
Figure 6:
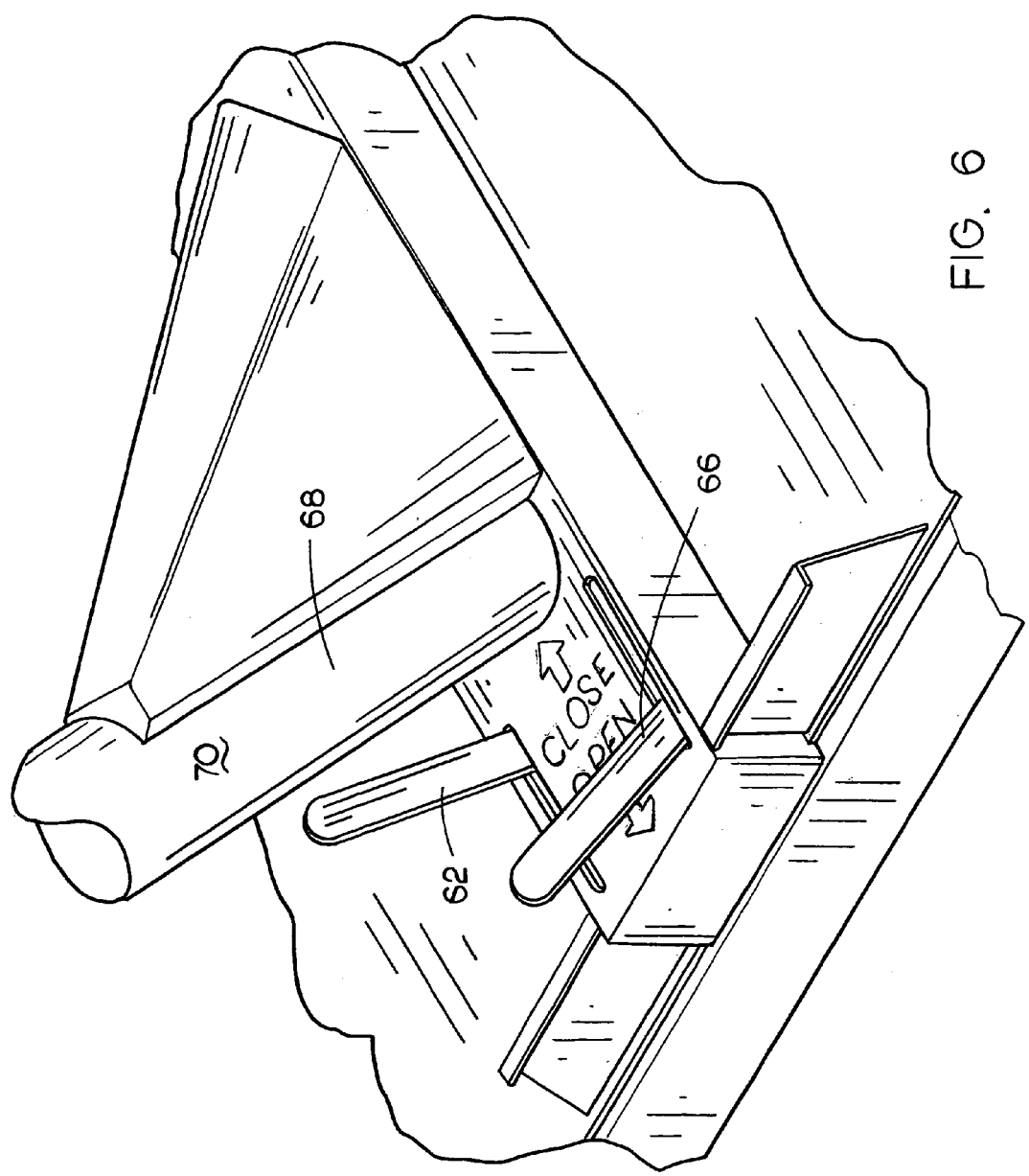
FIG. 6 is a perspective view illustrating the operating levers for each of the slide gates.
Figure 7:
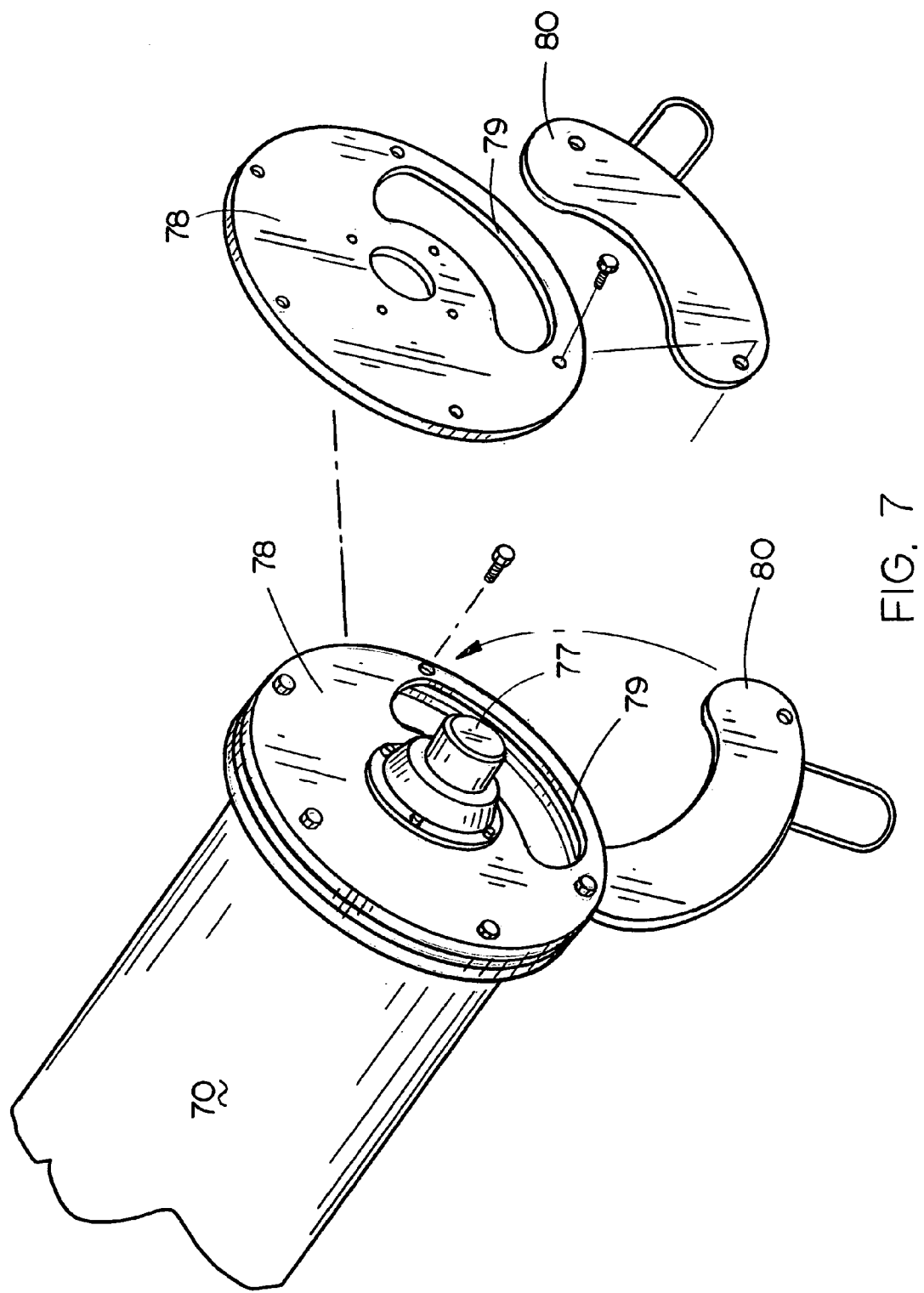
FIG. 7 is a perspective view of the lower end of the discharge auger conveyor and the clean out mechanism associated therewith.

The seed dispensing cart, caddy, trailer, system or apparatus of this invention is generally designated by the reference numeral 10 which is designed for transporting bulk seed containers 12 and 14, which are identical to each other, and for dispensing the seed within the containers into seed boxes or hoppers of planting equipment such as row crop planters or grain drills. The containers 12 are sometimes referred to as totes and are readily available from one or more manufacturers. The containers are usually constructed of plastic. The containers or totes 12 include a sloped floor 15 so that the seed therein will gravity flow to the discharge opening 16 therein which is selectively closed by a manually operated slide gate 18.

The seed cart, caddy, apparatus, system or trailer will be referred to herein, for purposes of description, as a "trailer." Trailer 10 includes a wheeled frame 20 supported by wheels 22 at each side thereof. A forwardly extending tongue or hitch 24 is provided on the wheeled frame 20 so that the trailer may be towed by a prime mover such as a truck, pickup, tractor, etc. An internal combustion engine 26 is mounted on the frame 20 for powering the conveyor auger as will be described in more detail hereinafter. It is preferred that an internal combustion engine 26 be utilized but the power source for the conveyor auger could be electrically driven, hydraulically driven or combinations thereof. Further, if the trailer 10 is being pulled by a tractor or the like, the source of power for the conveyor auger could be the tractor power take-off (PTO).

For purposes of description, the trailer 10 will be described as having a forward end 28, rearward end 30, a left side 32 and a right side 34. Trailer 10 is provided with a generally horizontally disposed deck 36 which defines a front deck portion 38 and a rear deck portion 40. The deck portions 38 and 40 are provided with attachment means for securing the containers or totes 12 thereon. Front deck portion 38 is provided with a seed inlet opening 42 which is in communication with the discharge opening 16 of the container 12 which is positioned on front deck portion 38. Seed inlet opening 44 is provided in deck portion 40 and is in communication with the discharge opening 16 in the container 12 positioned on rear deck portion 40.

Hopper 46 is positioned beneath inlet opening 42 in deck portion 38 and includes a back wall 48, front wall 50 and opposite side walls. As seen in the drawings, front wall 50 is sloped downwardly and rearwardly so that the seed falling from the container 12 through the inlet opening 42 will gravity move to the lower rearward end of the hopper 46. The lower rearward end of hopper 46 is provided with a selectively closeable opening 56 which communicates with a housing 58. Opening 56 is selectively closed by means of a slidable door 60 which is moved upwardly and downwardly with respect to the opening 56 by means of an operating handle 62 pivotally connected thereto and extending upwardly therefrom through the deck 36 at the left side of the trailer so that the operator may selectively open and close the opening 56 to prevent seed from flowing from the hopper 46 into the housing 58. Hopper 64 is positioned beneath inlet opening 44 and deck portion 40 and is identical to hopper 46 but is the mirror image thereof. For purposes of description, the operating lever for controlling the slide gate at the lower forward end of hopper 64 will be referred to by the reference numeral 66.

The numeral 68 refers to a conveyor screw auger including a lower auger section 70 and an upper auger section 72 which is selectively pivotally secured to the upper end of auger section 70. Conveyor auger 68 includes a rotatable auger 74, the lower end of which is positioned within the interior of housing 58. As stated earlier, the conveyor auger is selectively rotatable by the engine 26 by the belt and pulley assembly 75. The lower end of auger portion 70 extends below the lower ends of the hoppers 46 and 64 as well as the housing 58 and has a bearing provided therein which rotatably supports the lower end of the auger shaft. A pulley or sprocket 76 is operatively secured to the lower end of the auger shaft 77 so that rotation thereof by the engine 26 causes the auger 68 to rotate. The lower end of the lower section 70 is closed by a plate 78 having a semi-circular opening 79 formed therein which is selectively closed by a pivotal gate 80. When the gate 80 is in its closed position, the seed in the housing 50 cannot flow downwardly from the housing 50. When the gate 80 is in its open position, the housing 50 and either of the hoppers 46 or 64 may be "cleaned out." Thus, the gate 80, in cooperation with the opening 79, acts as a clean out mechanism.

A telescopic flexible tube 82 extends from the upper end of the conveyor auger 68 so that the operator may position the discharge end of the tube 82 over the planter seed boxes or hoppers to fill the same. A remote control is provided at the discharge end of the tube 82 for controlling the speed of the engine 26. When the housing 50 is full of seed, the idling engine was not cause the rotation of the auger 68 due to the resistance of the seed on the auger. When the remote control is energized, the engine speed will be increased which will cause the conveyor to overcome the resistance of the grain in the housing 50 so that the seed will be conveyed upwardly through the conveyor 68 and downwardly through the tube 82. When the planter box or hopper is full, the operator releases the remote control which causes the engine to again idle which in turn causes the conveyor to discontinue its rotation.

An extremely important feature of this invention is that each of the containers has its own hopper with each of the hoppers being selectively closed so that only seed from a particular container will be discharged into the planter. For example, the operator or farmer may plant different hybrids or varieties in different fields. The trailer 10 may be pulled to a first field and the seed from one of the containers may be discharged into the housing 50 into the planters. The trailer may then be taken to a different field where a different hybrid or variety is to be planted with the other container then being placed in communication with the housing 50 and the first container being shut off from the housing 50. Although it is preferred that a pair of the bulk seed containers be accommodated, the trailer may be provided with more than two hoppers and more than two deck portions which support the containers thereon.

The apparatus of this invention is a low profile apparatus which makes it very easy to transport the same over highways without fear that the apparatus will tip over as it is being negotiated through a curve or over irregular ground.

Thus it can be seen that the invention accomplishes at least all of its stated objectives.

I claim:

1. A seed handling and dispensing apparatus for transporting bulk seed containers and for dispensing the seed within said containers into planting equipment, comprising:
 a wheeled frame having a forward end, a rearward end, and first and second sides;
 said wheeled frame having a forwardly extending hitch tongue for connection to a prime mover;
 a generally horizontally disposed deck provided on said wheeled frame defining at least a front deck portion and a rear deck portion;
 said front and rear deck portions adapted to have front and back bulk seed containers positioned thereon, respectively;
 said front deck portion having a front seed inlet opening formed thereon;
 said rear deck portion having a rear seed inlet opening formed therein;
 a front seed hopper positioned beneath said front seed inlet opening and having an open upper end in communication therewith;
 said front seed hopper having a selectively closeable seed discharge opening at its lower end;
 a rear seed hopper positioned beneath said rear seed inlet opening and having an open upper end in communication therewith;
 said rear seed hopper having a selectively closeable seed discharge opening at its lower end;
 a housing positioned at the lower ends of said front and rear seed hoppers which is in communication with the said discharge openings thereof;
 a seed discharge auger conveyor on said wheeled frame and having upper and lower ends;
 said lower end of said discharge auger conveyor being in communication with said housing;
 said discharge auger conveyor extending upwardly and generally laterally from said wheeled frame;
 a seed discharge tube having upper and lower ends;
 said upper end of said tube being connected to and being in communication with said upper end of said discharge auger conveyor;
 a power means adapted to operate said discharge auger conveyor.

2. The apparatus of claim 1 wherein a seed clean out mechanism is provided on said housing.

3. The apparatus of claim 2 wherein said seed clean out mechanism comprises a disc-shaped plate having a discharge opening formed therein which is selectively closeable by a pivotal plate selectively movable between open and closed positions.

4. The apparatus of claim 1 wherein said selectively closeable seed discharge openings are selectively closeable by means of slide gates.

5. A seed handling and dispensing apparatus for transporting bulk seed containers and for dispensing the seed within said containers into planting equipment, comprising:
 a wheeled frame having a forward end, a rearward end, and first and second sides;
 said wheeled frame having a forwardly extending hitch tongue for connection to a prime mover;
 a generally horizontally disposed deck provided on said wheeled frame defining a plurality of deck portions;
 said deck portions adapted to have bulk seed containers positioned thereon, respectively;
 each of said deck portions having a seed inlet opening formed thereon;
 a seed hopper positioned beneath each of said seed inlet openings and having an open upper end in communication therewith;
 each of said seed hoppers having a selectively closeable seed discharge opening at its lower end;
 a housing positioned at the lower ends of said seed hoppers which is in selective communication with the said discharge openings thereof;
 a seed discharge auger conveyor on said wheeled frame and having upper and lower ends;
 said lower end of said discharge auger conveyor being in communication with said housing;
 said discharge auger conveyor extending upwardly and generally laterally from said wheeled frame;
 a seed discharge tube having upper and lower ends;
 said upper end of said tube being connected to and being in communication with said upper end of said discharge auger conveyor;
 a power means adapted to operate said discharge auger conveyor.

6. The apparatus of claim 5 wherein a seed clean out mechanism is provided on said housing.

7. The apparatus of claim 6 wherein said seed clean out mechanism comprises a disc-shaped plate having a discharge opening formed therein which is selectively closeable by a pivotal plate selectively movable between open and closed positions.

8. The apparatus of claim 5 wherein said selectively closeable seed discharge openings are selectively closeable by means of slide gates.

* * * * *